US007810598B2

(12) United States Patent
Nonogaki

(10) Patent No.: US 7,810,598 B2
(45) Date of Patent: Oct. 12, 2010

(54) ENGINE COVER

(75) Inventor: Haruhiko Nonogaki, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 464 days.

(21) Appl. No.: 11/979,971

(22) Filed: Nov. 13, 2007

(65) Prior Publication Data

US 2008/0110432 A1 May 15, 2008

(30) Foreign Application Priority Data

Nov. 14, 2006 (JP) ............................ 2006-308244
Sep. 26, 2007 (JP) ............................ 2007-249035

(51) Int. Cl.
*B62D 25/10* (2006.01)
*F02B 77/02* (2006.01)

(52) U.S. Cl. ................ 180/69.22; 180/69.23; 296/39.3; 123/198 E

(58) Field of Classification Search ................ 180/69.2, 180/69.21, 69.22, 69.23; 296/39.3; 123/198 E; 181/204; 440/76, 77
See application file for complete search history.

(56) References Cited

U.S. PATENT DOCUMENTS 2,582,839 A * 1/1952 Lippard et al. .............. 280/847
6,699,083 B2 * 3/2004 Rinzaki et al. ................ 440/77
2005/0211484 A1 * 9/2005 Ellerman ................... 180/69.2
2006/0141877 A1 * 6/2006 Kameoka ..................... 440/77
2006/0172631 A1 * 8/2006 Kameoka ..................... 440/77

FOREIGN PATENT DOCUMENTS

JP A-07-267146 10/1995

* cited by examiner

*Primary Examiner*—Hau V Phan
*Assistant Examiner*—John R Olszewski
(74) *Attorney, Agent, or Firm*—Posz Law Group, PLC

(57) ABSTRACT

An engine cover which can improve the assembly work and prevent noise generated at a joint between divisional bodies is provided. A first divisional body of the engine cover includes a first cover main body and a first mounting end portion provided to one end portion of the first cover main body, and a second divisional body of the engine cover includes a second cover main body and a second mounting end portion provided to one end portion of the second cover main body. The first mounting end portion is provided with a first engaging end portion arranged in a down direction of the first cover main body and extending in a diametric direction outwardly thereof. The second mounting end portion is provided with a second engaging end portion arranged in a down direction of the second cover main body and extending in a diametric direction outwardly thereof. At least one portion of the second engaging end portion is arranged in an inner circumferential side of the second cover main body from an outer circumferential end portion thereof. The first engaging end portion is held between the second engaging end portion and a main body side engaging portion which is one portion of the second cover main body to integrate the first divisional body and the second divisional body. A cushion body formed of an elastic material is mounted between the first engaging end portion and the main body side engaging portion and/or between the first engaging end portion and the second engaging end portion.

7 Claims, 12 Drawing Sheets

ENGINE COVER

INCORPORATION BY REFERENCE

This disclosure of Japanese Patent Application No. 2006-308244 filed on Nov. 14, 2006 and Japanese Patent Application No. 2007-249035 filed on Sep. 26, 2007, including the specification, drawings, and abstract is incorporated by reference in its entirety.

BACKGROUND OF THE INVENTION

1. Field of the Invention

The present invention relates to an engine cover for covering an upper surface of an engine side member in a vehicle.

2. Description of the Related Art

An engine room of a vehicle is provided with an engine side member. The engine side member is integrated by assembling members such as an engine, a cylinder head cover or the like. The upper surface of the engine side member is generally covered with an engine cover. The engine cover covers the engine side member so as to improve the design of the engine room and to shut out or attenuate noise emitted outwards from the engine. The engine cover is designed in the various shapes according to a shape of the engine side member, a shape of the engine room or the like. Also, the engine cover may be constituted by a plurality of divisional bodies easily to detach the engine cover from the engine side member when a tower bar is installed in the engine room.

When the engine cover is constituted by plural divisional bodies, a step may be generated at a joint between the divisional bodies while the engine cover is attached on the engine side member. When the step is generated at a joint between the divisional bodies, the divisional bodies can be not arranged on the coplanar surface, and thus the design of the engine room may be deteriorated. When the engine cover vibrates due to vibration transferred from the engine or vibration occurring during the vehicle traveling, an end portion of one divisional body strikes against an end portion of another divisional body in the joint portion between the divisional bodies. As a result, a noise is generated.

The structure, which is assembled by the divisional bodies in a trunk side constituted by plural divisional bodies, is disclosed in the Japanese Laid Open patent Publication No. 7-267146. In the structure which is assembled by the divisional bodies disclosed in the Japanese Laid Open patent Publication No. 7-267146, a step portion is formed at the end portion of one divisional body, and an engaging hole is formed at the step portion. Also, an engaging member coupled to the engaging hole is formed at the end portion of another divisional body. In this way, it is possible to reduce the step generated at the joint between two divisional bodies.

However, in the structure which is assembled by the divisional bodies disclosed in the Japanese Laid Open patent Publication No. 7-267146, a relatively large space is required during assembly work. Meanwhile, the engine cover is arranged in the engine room having a small space. Therefore, when the above-mentioned art is applied to the engine cover, there is a problem that work efficiency of assembly is deteriorated. When two divisional bodies are formed of hard material, there is also a problem that the noise is still generated in the joint between the divisional bodies.

SUMMARY OF THE INVENTION

The present invention has been made in view of the above problems, and provides an engine cover which can improve the assembly work and prevent a noise generated at a joint between divisional bodies.

In an engine cover in accordance with the present invention, the engine cover having plural divisional bodies for covering an upper surface of an engine side member in a vehicle comprises: a first divisional body, which is one of the divisional bodies, including a first cover main body and a first mounting end portion, wherein the first cover main body is formed of a plate shape and has a first fixed portion fixed to the engine side member, and where in the first mounting end portion is provided to one end portion of the first cover main body and includes a first engaging end portion arranged in a down direction of the first cover main body and extending in an diametric direction of the first cover main body outwardly; a second divisional body, which is another of the divisional bodies, including a second cover main body and a second mounting end portion, wherein the second cover main body is formed of a plate shape and has a second fixed portion fixed to the engine side member, and wherein the second mounting end portion is provided to one end portion of the second cover main body and includes a second engaging end portion arranged in a down direction of the second cover main body and extending in an diametric direction of the second cover main body outwardly; and a cushion body formed of an elastic material. At least one portion of the second engaging end portion is arranged in an inner circumferential side of the second cover main body from an outer circumferential end portion of the second cover main body; the first engaging end portion is held between the second engaging end portion and a main body side engaging portion which is a portion facing the second engaging end portion in the second cover main body to integrate the first divisional body and the second divisional body; and the cushion body is mounted between the first engaging end portion and the main body side engaging portion and/or between the first engaging end portion and the second engaging end portion.

The engine cover in accordance with the present invention preferably includes any one of the following (1)~(6). It is more preferable to include two or more of the following (1)~(6).

(1) A distal end of the second engaging end portion extends from the outer circumferential end portion of the second cover main body to the outer circumferential side of the second cover main body.

(2) The first mounting end portion includes a first leg portion extending downward from the outer circumferential end portion of the first cover main body and continued to the first engaging end portion; and the second mounting end portion includes a second leg portion extending downward from a lower surface of the inner circumferential side in the second cover main body other than the outer circumferential end portion of the second cover main body and continued to the second engaging end portion.

(3) The second cover main body, which is formed of a curved plate shape, includes an upper wall portion having a plate shape and a side wall portion continued to the upper wall portion and extending downward; and the second engaging end portion is continued to the side wall portion.

(4) A distance between the second engaging end portion and the main body side engaging portion increases toward the outer circumferential side of the second cover main body from the inner circumferential side of the second cover main body; and the first engaging end portion extends in parallel with the second engaging end portion in a state where the first divisional body and the second divisional body is integrated.

(5) The engine cover further comprises: a second cushion body formed of an elastic material, wherein one portion of the first engaging end portion faces an opposite portion which is one portion of the second cover main body excepting the main body side engaging portion; wherein the cushion body is mounted only between the first engaging end portion and the second engaging end portion; and wherein the second cushion body is mounted between the first engaging end portion and the opposite portion.

(6) A center of the first fixed portion is different from a center of gravity in the first divisional body; and the first mounting end portion is arranged in an area opposed to the center of the first fixed portion with respect to the center of gravity in the first divisional body between the first mounting end portion and the center of the first fixed portion.

The first engaging end portion of the first divisional body is held between the main body side engaging portion of the second divisional body and the second engaging end portion thereof, so that the first divisional body and the second divisional body in the engine cover in accordance with the present invention are assembled with each other. Therefore, in accordance with the engine cover of the present invention, when the first divisional body and the second divisional body are assembled, or when at least one side of the first divisional body and the second divisional body are detached from the engine side member, the complicated work is not required. Accordingly, the assembly work of the engine cover in accordance with the present invention can be improved.

In the engine cover of the present invention, the cushion body formed of the elastic material is mounted between the second engaging end portion and the main body side engaging portion and/or between the first engaging end portion and the second engaging end portion. Thus, even when the vibration transferred from the engine or the vibration generated during the vehicle traveling is transferred to the first divisional body or the second divisional body, and each divisional body greatly vibrates, the cushion body absorbs this vibration. Therefore, it is possible to prevent the vibration from being transferred to another divisional body. As a result, the noise generated at the joint between the divisional bodies as described above is greatly reduced.

Since the first engaging end portion is arranged in down direction of the first cover main body, the upper surface of the first engaging end portion is arranged in the down direction from the upper surface of the first cover main body and the upper surface of the main body side engaging portion. Thus, the upper surface of the main body side engaging portion and the upper surface of the first cover main body may be arranged on the coplanar surface. As a result, the step generated at the joint between the first divisional body and the second divisional body can be prevented, the design of the engine cover can be improved.

The engine cover of the present invention can reduce the noise generated at the joint between the divisional bodies, since the two divisional bodies is fixed to the engine side member in the different position with each other. That is, in the engine cover of the present invention, the first divisional body is fixed to the engine side member by the first fixed portion, and the second divisional body is fixed to the engine side member by the second fixed portion. Therefore, since each divisional body is stably and firmly fixed to the engine side member, even when the vibration transferred from the engine or the vibration generated during the vehicle traveling is transferred to each divisional body, each divisional body does not greatly vibrate. As a result, in the engine cover of the present invention, an end portion of one divisional body is unlikely to strike against an end portion of another divisional body, and thus the noise generated at the joint between the divisional bodies as described above can be greatly reduced.

In accordance with the engine cover of the present invention including the above (1), the two divisional bodies can be fixed to the engine side member while the first mounting end portion is raised by the distal end of the second engaging end portion. Thus, the assembly work of the engine cover in accordance with the present invention including the above (1) can be improved.

In accordance with the engine cover of the present invention including the above (2) or (3), at least one side of the first mounting end portion and the second mounting end portion can be constituted by simple structure. Thus, the manufacture cost of the engine cover can be reduced.

In accordance with the engine cover of the present invention including the above (4), since the distance between the second engaging end portion and the main body side engaging portion in the outer circumferential side of the second cover main body has an enough space, the first engaging end portion is easily inserted between the second engaging end portion and the main body side engaging portion. Thus, the assembly work of the engine cover in accordance with the present invention including the above (4) can be improved. Since the first engaging end portion extends in parallel with the second engaging end portion in a state where the first divisional body and the second divisional body are integrated, the first engaging end portion can be stably held by the second engaging end portion.

In accordance with the engine cover of the present invention including the above (5), since the first engaging end portion is pressed toward the main body side engaging portion by the cushion body, the joining portion between the first divisional body and the second divisional body (the upper surface of the main body side engaging portion and the upper surface of the first cover main body) can be surely arranged on the coplanar surface. Since the cushion body is not mounted between the first engaging end portion and the main body side engaging portion, the first engaging end portion is easily inserted between the second engaging end portion and the main body side engaging portion. Thus, the assembly work of the engine cover in accordance with the present invention including the above (5) can be improved. Since the cushion body is mounted between the first engaging end portion and the second engaging end portion and the second cushion body is mounted between the opposite portion and the first engaging end portion, it is possible to prevent the first divisional body and the second divisional body from relatively moving in the up and down direction. Thus, it is possible to prevent the noise from generating at the joint between the divisional bodies. As a result, the design and the assembly work in the engine cover of the present invention including the above (5) can be improved, and it is possible to prevent the noise from generating at the joint between the divisional bodies.

In accordance with the engine cover of the present invention including the above (6), the noise generated at the joint between the divisional bodies can be reduced, and the assembly work can be further improved. That is, when the center of the first fixed portion is different from the center of the gravity in the first divisional body, the first divisional body inclines to a direction of the center of gravity when the first divisional body is pre-fixed to the engine side member. The first mounting end portion of the first divisional body is arranged in the area opposed to the center of the first fixed portion with the center of gravity in the first divisional body being interposed in between. Thus, when the first divisional body inclines to the direction of the center of gravity, the first mounting end portion greatly hangs down. When the first mounting end portion hangs down, the first engaging end portion of the first mounting end portion is pressure-contacted to the second engaging end portion of the second divisional body, and thus the first engaging end portion and the second engaging end portion are attached with each other. At this state, since the first divisional body and the second divisional body are fixed to the engine side member, the first divisional body and the second divisional body can be assembled while the first engaging end portion and the second engaging end portion are attached with each other by the simple assembly process. The first divisional body and the second divisional body are stably and firmly fixed with each other by attaching the first engaging end portion and the second engaging end portion. Thus, even when the vibration transferred from the engine or the vibration generated during the vehicle traveling is transferred to the first divisional body and the second divisional body, it is possible to prevent the first divisional body and the second divisional body from greatly vibrating. As a result, the noise generated at the joint between the divisional bodies as described above is greatly reduced.

In the engine cover of the present invention, the first divisional body and the second divisional body may be directly fixed to the engine, respectively. Also, the first divisional body and the second divisional body may be fixed to the engine side member (e.g., a cylinder head cover or the like) excepting the engine. The engine cover of the present invention may be constituted only by the first divisional body and the second divisional body. Also, the engine cover of the present invention may further include divisional bodies excepting the first divisional body and the second divisional body. The engine cover of the present invention may include one group of mounting structure portion consisting of the first engaging end portion, the second engaging end portion and the main body side engaging portion. Also, the engine cover of the present invention may include plural groups.

The first divisional body and the second divisional body may be formed of the plate shape. Also, first divisional body and the second divisional body may be formed of various shapes such as the flat plate shape, the curved plate shape or the like.

BRIEF DESCRIPTION OF THE DRAWINGS

The above and other objects and features of the present invention will become apparent from the following description of specified embodiment, given in conjunction with the accompanying drawings, in which.

DESCRIPTION OF THE SPECIFIC EMBODIMENTS

Various embodiments of the present invention will now be described in detail with reference to the accompanying drawings.

First Embodiment

Figure 1:
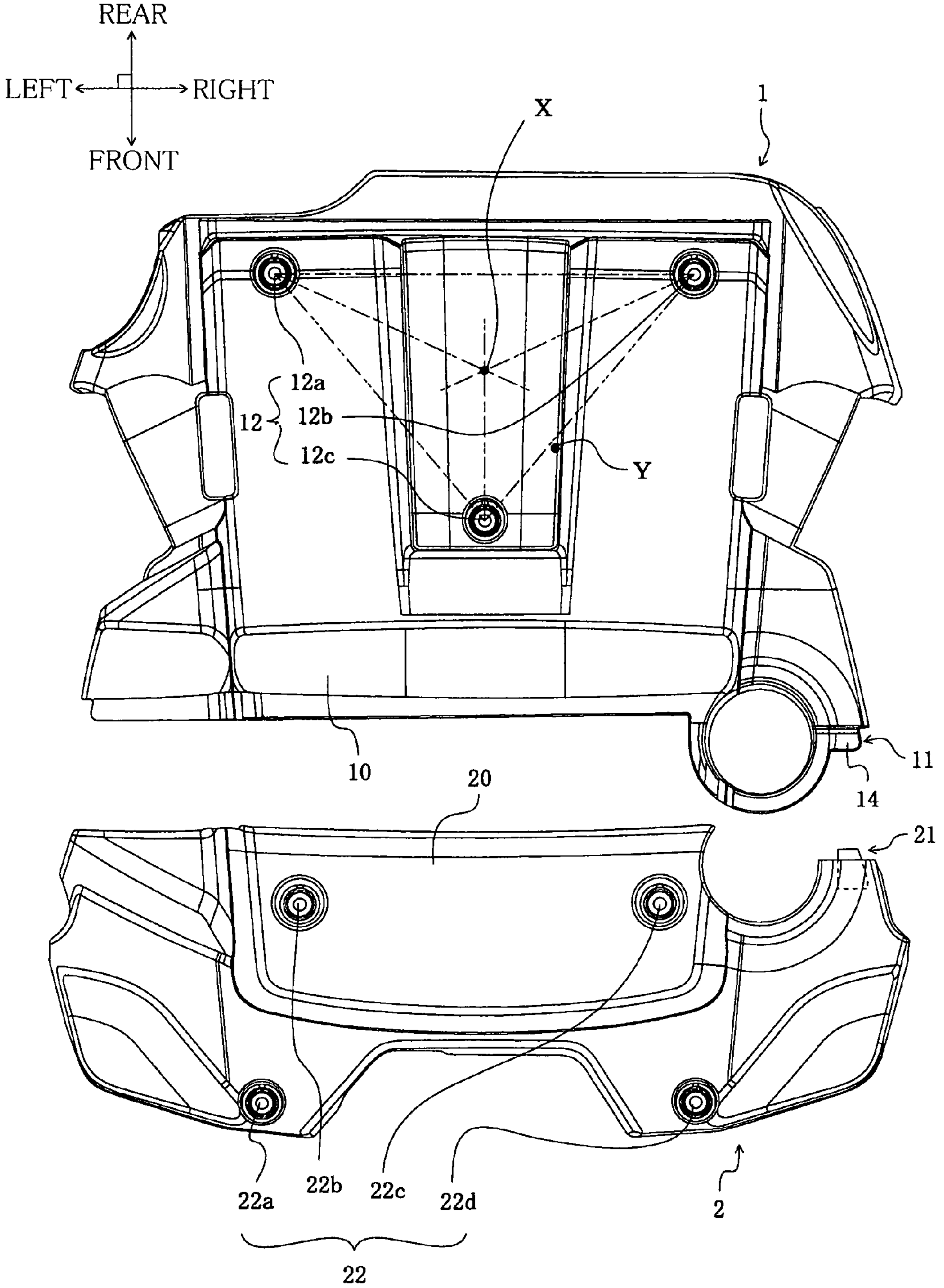
FIG. 1 is a top view schematically illustrating an engine cover in accordance with a first embodiment of the present invention.
Figure 2:
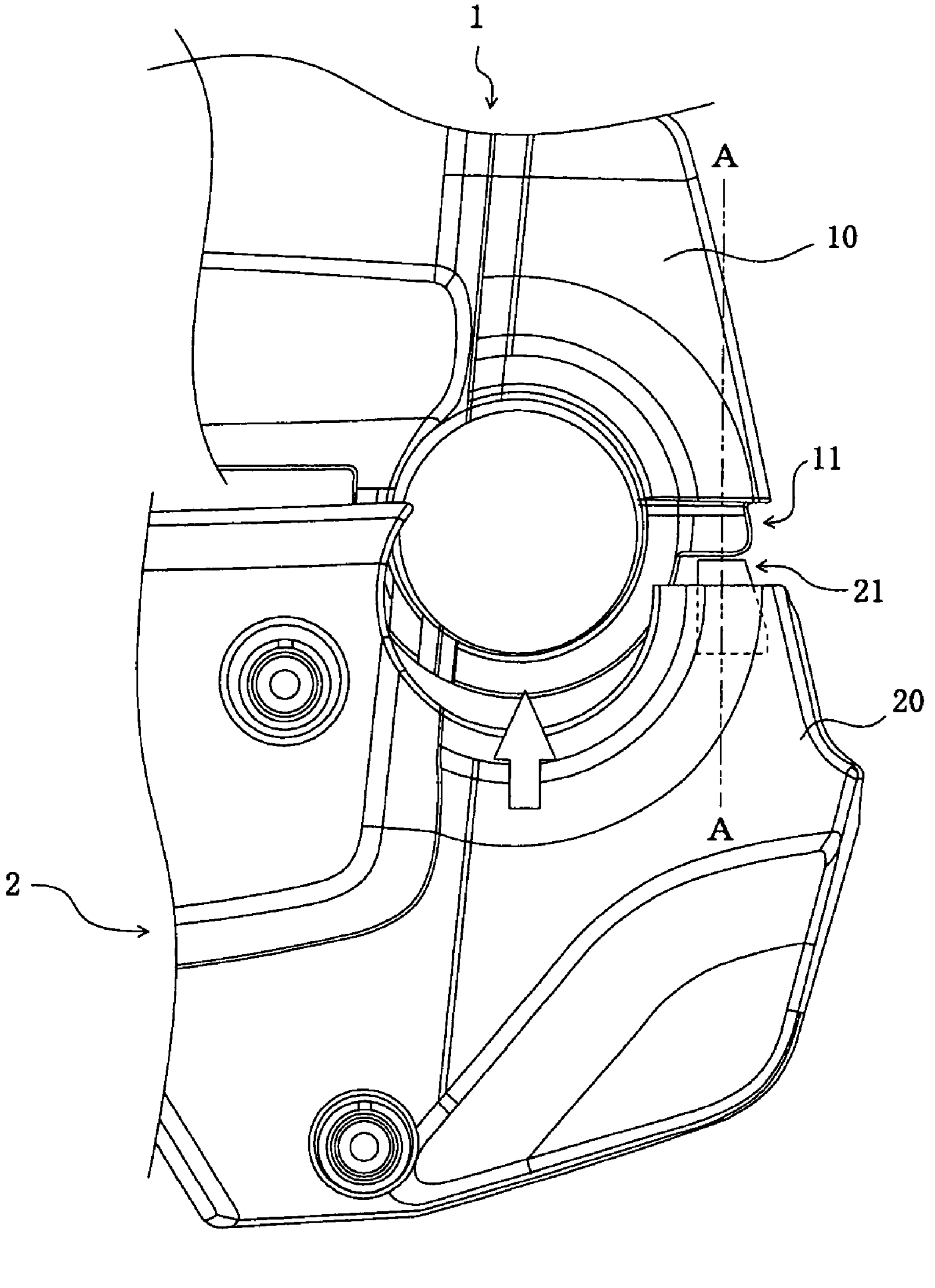
FIG. 2 is an enlarged top view of a main part schematically illustrating an appearance of a first divisional body and a second divisional body in an engine cover assembled to an engine side member in accordance with a first embodiment of the present invention.
Figure 3:
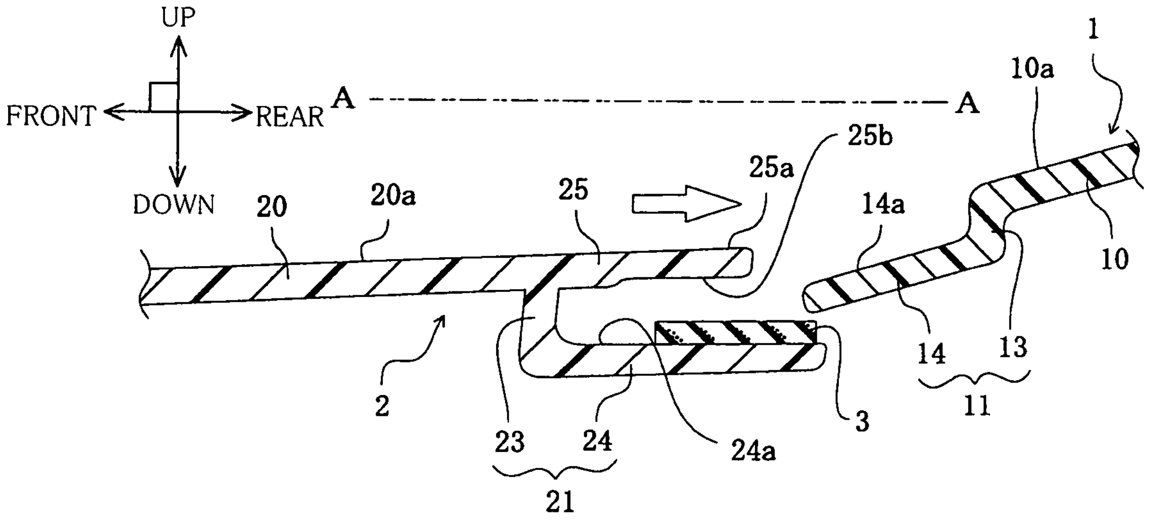
FIG. 3 is an enlarged sectional view of a main part schematically illustrating an appearance of a first divisional body and a second divisional body in an engine cover assembled to an engine side member in accordance with a first embodiment of the present invention.
Figure 4:
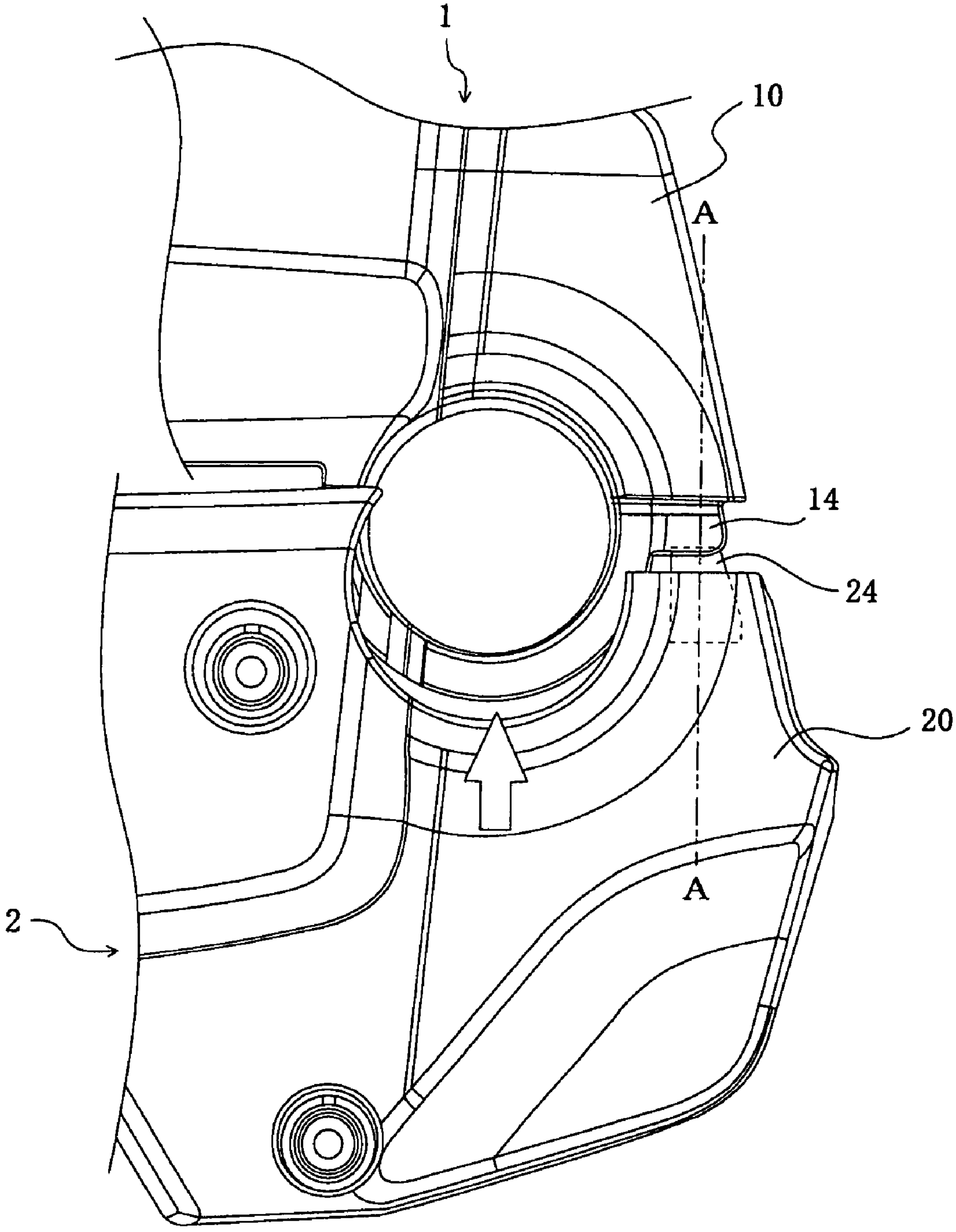
FIG. 4 is an enlarged top view of a main part schematically illustrating an appearance of a first divisional body and a second divisional body in an engine cover assembled to an engine side member in accordance with a first embodiment of the present invention.
Figure 5:
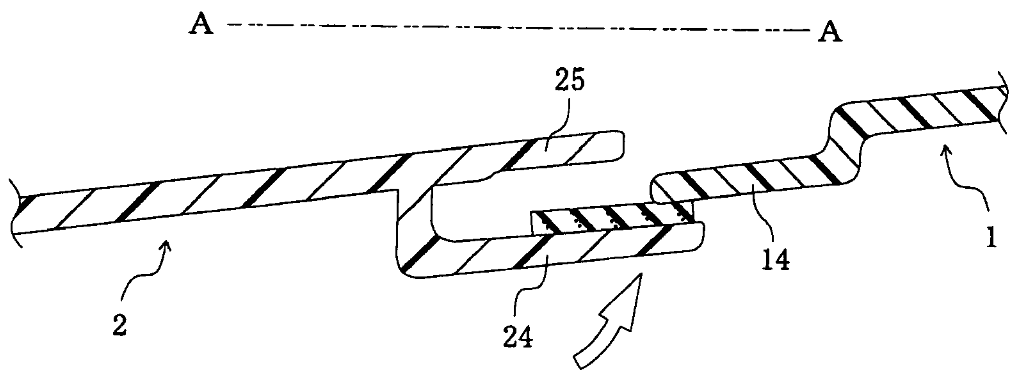
FIG. 5 is an enlarged sectional view of a main part schematically illustrating an appearance of a first divisional body and a second divisional body in an engine cover assembled to an engine side member in accordance with a first embodiment of the present invention.
Figure 6:
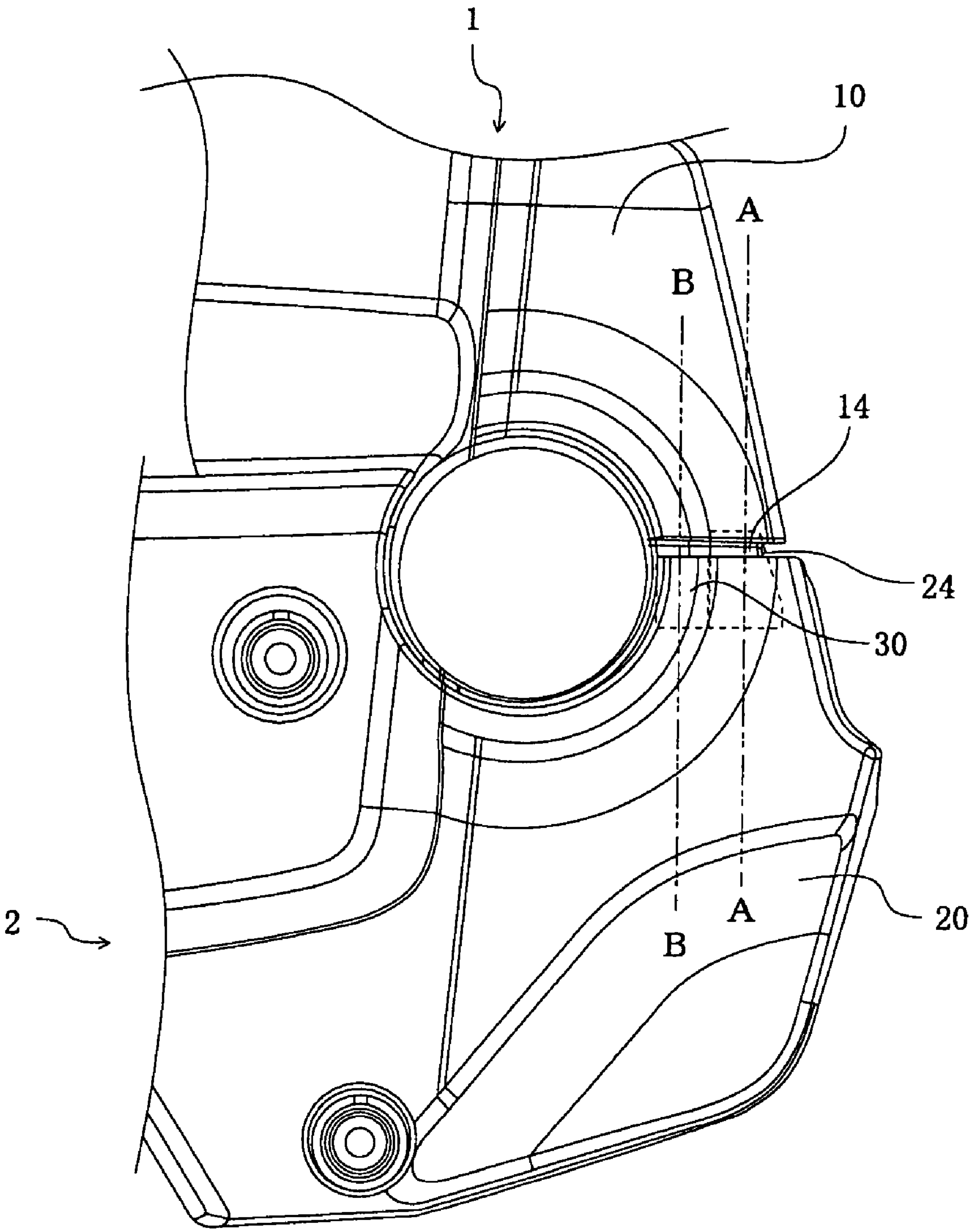
FIG. 6 is an enlarged top view of a main part schematically illustrating an appearance of a first divisional body and a second divisional body in an engine cover assembled to an engine side member in accordance with a first embodiment of the present invention.
Figure 7:
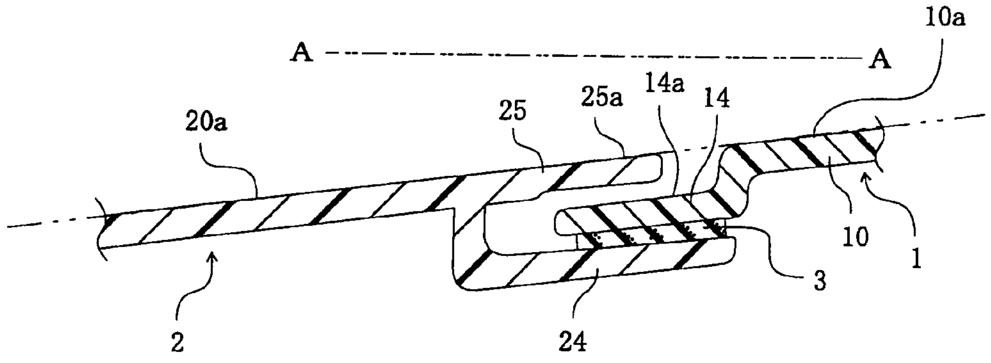
FIG. 7 is an enlarged sectional view of a main part schematically illustrating an appearance of a first divisional body and a second divisional body in an engine cover assembled to an engine side member in accordance with a first embodiment of the present invention.
Figure 8:
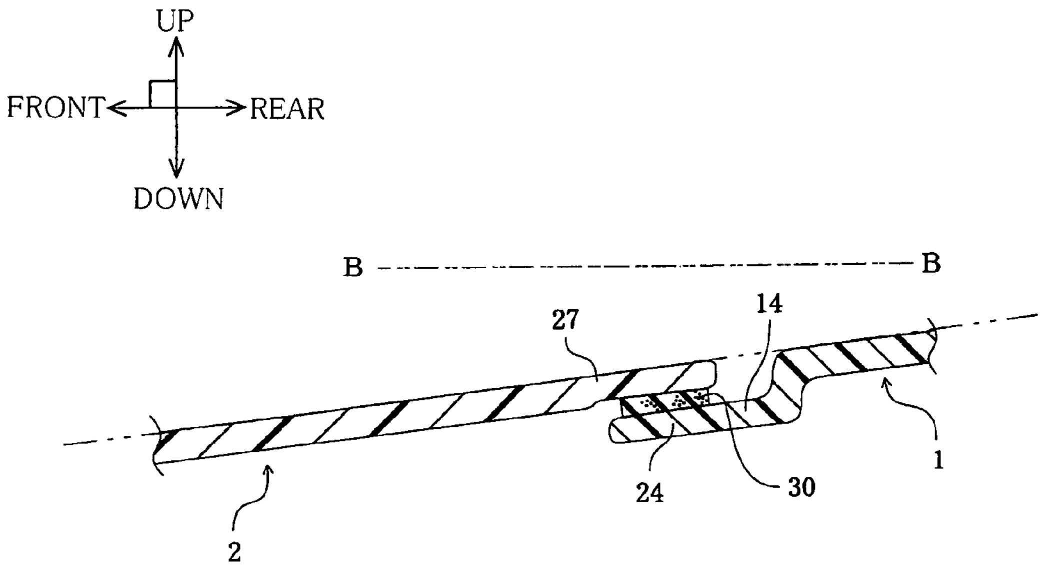
FIG. 8 is an enlarged sectional view of a main part schematically illustrating an appearance of a first divisional body and a second divisional body in an engine cover assembled to an engine side member in accordance with a first embodiment of the present invention.

An engine cover in accordance with a first embodiment of the present invention includes one mounting structure portion. The engine cover according to the first embodiment includes the above-described (1), (2), (5) and (6). FIG. 1 is a top view schematically illustrating an engine cover in accordance with a first embodiment of the present invention. FIG. 2, FIG. 4 and FIG. 6 are enlarged top views of a main part schematically illustrating an appearance of a first divisional body and a second divisional body in an engine cover assembled to an engine side member in accordance with a first embodiment of the present invention. FIG. 3, FIG. 5, FIG. 7 and FIG. 8 are enlarged sectional views of a main part schematically illustrating an appearance of a first divisional body and a second divisional body in an engine cover assembled to an engine side member in accordance with a first embodiment of the present invention. FIG. 3 refers to an appearance of cutting the first divisional body and the second divisional body in A-A position of FIG. 2. FIG. 5 refers to an appearance of cutting the first divisional body and the second divisional body in A-A position of FIG. 4. FIG. 7 refers to an appearance of cutting the first divisional body and the second divisional body in A-A position of FIG. 6. FIG. 8 refers to an appearance of cutting the first divisional body and the second divisional body in B-B position of FIG. 6. Hereinafter, a front, a rear, a left and a right in the first embodiment indicate a front, a rear, a left and a right shown in FIG. 1. An up and a down in the first embodiment indicate an up and a down shown in FIG. 3.

The engine cover of the first embodiment consists of the first divisional body 1 and the second divisional body 2. The first divisional body 1 includes a first cover main body 10 and a first mounting end portion 11. The first cover main body 10 is substantially formed of a plate shape and includes a first fixed portion 12. The first fixed portion 12 is configured as three through holes 12*a*, 12*b* and 12*c*. A center X of the three through holes 12*a*, 12*b* and 12*c* (i.e., a center of the first fixed portion 12) exists in the left-rear side from a center of gravity Y in the first divisional body 1, wherein the three through holes 12*a*, 12*b* and 12*c* are formed in the first cover main body 10.

The first mounting end portion 11 is provided in the right side of the front end portion of the first cover main body 10. That is, the first mounting end portion 11 is arranged in an area opposed to the center X of the first fixed portion 12 with the center of gravity Y in the first divisional body 10 being interposed in between. The first mounting end portion 11 includes a first leg portion 13 and a first engaging end portion 14. As shown in FIG. 3, the first leg portion 13 extends downward from an outer circumferential end portion of the front side of the first cover main body 10. The first engaging end portion 14 is continued to the first leg portion 13 and extends in the diametric direction of the first cover main body 10 outwardly (i.e., an outward direction in the first cover main body 10 toward an end surface of the second divisional body 2 side or the front direction shown in FIG. 3). Thus, a step shape is formed between an upper surface 10*a* of the first cover main body 10 and an upper surface 14*a* of the first engaging end portion 14. The entire of the first engaging end portion 14 extends from the outer circumferential end portion of the front side of the first cover main body 10 to the outer circumferential side (the front side) of the first cover main body 10. A thickness of the first engaging end portion 14 is nearly constant, and the first engaging end portion 14 extends nearly in parallel with the first cover main body 10.

The second divisional body 2 includes a second cover main body 20 and a second mounting end portion 21. The second cover main body 20 is substantially formed of a plate shape and includes a second fixed portion 22. The second fixed portion 22 is configured as four through holes 22*a*, 22*b*, 22*c* and 22*d*. The second mounting end portion 21 is provided in the right side of the rear end portion of the second divisional body 2. The second mounting end portion 21 includes a second leg portion 23 and a second engaging end portion 24. As shown in FIG. 3, the second leg portion 23 extends downward from a lower surface, the lower surface being disposed on a more diametrically inward side than the rear side of the outer circumferential end portion of the second cover main body 20 is disposed. A length in the up and down direction of the second leg portion 23 is greater than that of the first leg portion 13. The second engaging end portion 24 is continued to the second leg portion 23 and extends in the diametric direction of the second cover main body 20 outwardly (i.e., an outward direction in the second cover main body 20 toward an end surface of the first divisional body 1 side or the rear direction shown in FIG. 3). The second engaging end portion 24 extends nearly in parallel with the second cover main body 20. One portion of the second engaging end portion 24 is arranged in the inner circumferential side (the front side) of the second cover main body 20 from the outer circumferential end portion of the rear side of the second cover main body 20. The other portion of the second engaging end portion 24 extends beyond the outer circumferential end portion of the rear side of the second cover main body 20 toward the outer peripheral side (the rear side) of the engine cover.

An upper surface 25*a* of a portion facing the second engaging end portion 24 in the second cover main body 20 (a main body side engaging portion 25) is on the coplanar surface as an upper surface 20*a* of the second cover main body 20. A distance between the main body side engaging portion 25 and the second engaging end portion 24 increases toward the outer circumferential side of the second cover main body 20 from the inner circumferential side thereof. In detail, a lower surface 25*b* of the main body side engaging portion 25 and an upper surface 24*a* of the second engaging end portion 24 are apart from each other in the up and down direction. The lower surface 25*b* of the main body side engaging portion 25 has a step shape in which a portion positioned in the outer circumferential side of the second cover main body 20 is higher than a portion positioned in the inner circumferential side thereof. Therefore, a distance between the lower surface 25*b* of the main body side engaging portion 25 and the upper surface 24*a* of the second engaging end portion 24 increases toward the outer circumferential side (the rear side in FIG. 3) of the second cover main body 20 from the inner circumferential side (the front side in FIG. 3) thereof. A distance between the lower surface 25*b* of the main body side engaging portion 25 and the upper surface 24*a* of the second engaging end portion 24 in the up and down direction is greater than the thickness of the first mounting end portion 11.

A cushion body 3 and a second cushion body 30, which have a sponge shape and are made of EDPM (i.e., Ethylene Propylene Diene Monomer), are fixed to the second divisional body 2. In particular, the cushion body 3 is fixed to the upper surface 24*a* of the second engaging end portion 24. The second cushion body 30 is fixed to a lower surface of an opposite portion 27. The opposite portion 27 is a portion facing the first engaging end portion 14 in a portion excepting the main body side engaging portion 25 in the second cover main body 20. In the first embodiment, the opposite portion 27 is adjacent to the main body side engaging portion 25. Although not shown, a third cushion body having sponge shape made of the EDPM is fixed to a lower surface of a rear end portion of the second cover main body 20 excepting the main body side engaging portion 25.

In an engine side member (not shown), an engine side first fixed portion (not shown) is formed at a position corresponding to the three through holes (the first fixed portion 12) of the first divisional body 1. In the engine side member, an engine side second fixed portion (not shown) is formed at a position corresponding to the four through holes (the second fixed portion 22) of the second divisional body 2. The engine side first fixed portion is configured as three screw receiving holes. The engine side second fixed portion is configured as four screw receiving holes.

Hereinafter, a method for assembling the engine cover according the first embodiment to the engine side member is described.

First, the first divisional body 1 is pre-fixed to the engine side member (not shown). As described above, in an engine side member, the engine side first fixed portion configured as the three screw receiving holes is formed at the position corresponding to the three through holes (the first fixed portion 12) of the first divisional body 1. Therefore, after the first divisional body 1 is put on the upper portion of the engine side member, when bolts (not shown) are inserted into the three through holes of the first divisional body 1, respectively, each distal end of bolts is inserted into each the screw receiving hole, and thus the first divisional body 1 is pre-fixed to the engine side member. As shown in FIG. 1, the center X of the first fixed portion 12 (the center of the three through holes 12*a*-12*c*) and the center of gravity Y in the first divisional body 1 exist in a different position with each other. Thus, when the first divisional body 1 is pre-fixed to the engine side member, the first divisional body 1 inclines to a direction of the center of gravity Y according to gravity. The first mounting end portion 11 is arranged in the area opposed to the center X of the first fixed portion 12 with the center of gravity Y in the first divisional body 10 being interposed in between. Thus, the first mounting end portion 11 greatly hangs down toward the engine side member when the first divisional body 1 inclines to the direction of the center of gravity Y (see FIG. 3).

Next, the second divisional body 2 is pre-fixed to the engine side member. At this time, after the second divisional body 2 is provided on the upper portion of the engine side member, the second engaging end portion 24 is inserted into the down direction of the first engaging end portion 14, as shown in FIG. 2 and FIG. 3. As shown in FIG. 4 and FIG. 5, while the second engaging end portion 24 raises the first engaging end portion 14, the first engaging end portion 14 is sandwiched between the second engaging end portion 24 and the main body side engaging portion 25. When bolts (not shown) are inserted into each through hole of the second fixed portion 22, respectively, each distal end of bolts is inserted into the respective screw receiving holes of the engine side second fixed portion. When the bolts are screwed to the screw receiving holes of the engine side second fixed portion, the second divisional body 2 is fixed to the engine side member. As described above, since the first engaging end portion 14 hangs down due to the gravity, the first engaging end portion 14 is held between the second engaging end portion 24 and the main body side engaging portion 25 in a state where the first engaging end portion 14, which is raised by the second engaging end portion 24, is pressure-contacted to the second engaging end portion 24 (see FIG. 6 and FIG. 7).

Thereafter, the bolts (not shown) which are inserted into the respective three through holes of the divisional body 1 are screwed each screw receiving hole, and the first divisional body 1 is fixed to the engine side member. Thus, the engine cover according to the first embodiment is assembled to the engine side member.

In the engine cover according to the first embodiment, the first engaging end portion 14 of the first divisional body 1 is held between the second engaging end portion 24 and the main body side engaging portion 25 of the second divisional body 2, and the first divisional body 1 and the second divisional body 2 are integrated. Thus, work for assembling the first divisional body 1 and the second divisional body 2 to the engine side member may be also implemented only by the following processes: a process for pre-fixing the first divisional body 1 to the engine side member, a process for fixing the second divisional body 2 to the engine side member while the second engaging end portion 24 of the divisional body 2 raises the first engaging end portion 14 of the divisional body 1, and a process for fixing the first divisional body 1 to the engine side member. Therefore, according to the engine cover of the first embodiment, the complicated work is not required when the first divisional body 1 and the second divisional body 2 are assembled. Accordingly, the assembly work of the engine cover according to the first embodiment can be improved.

The distance between the lower surface 25*b* of the main body side engaging portion 25 and the upper surface 24*a* of the second engaging end portion 24 in the up and down direction increases toward the outer circumferential side of the second cover main body 20 from the inner circumferential side thereof. Therefore, the work for inserting the first engaging end portion 14 between the main body side engaging portion 25 and the second engaging end portion 24 is easy. Thus, the assembly work of the engine cover according to the first embodiment can be improved.

According to the engine cover of the first embodiment, the first divisional body 1 is fixed to the engine side member by the first fixed portion 12, the second divisional body 2 is fixed to the engine side member by the second fixed portion 22, and the first engaging end portion 14 is held between the second engaging end portion 24 and the main body side engaging portion 25. Therefore, the first divisional body 1 and the second divisional body 2 are fixed to the engine side member, respectively, and the first divisional body 1 and the second divisional body 2 is firmly integrated. As a result, according to the engine cover of the first embodiment, it is difficult for the first divisional body 1 and the second divisional body 2 to rattle with respect to the engine side member, and it is difficult for the rattle to generate at the joint between the first divisional body 1 and the second divisional body 2. Thus, according to the engine cover of the first embodiment, it is possible to prevent the noise from generating during the vehicle traveling or the noise due to the vibration transferred from the engine from generating.

In the engine cover of the first embodiment, the cushion body 3 formed of an elastic material is mounted between the first engaging end portion 14 and the second engaging end portion 24, as shown in FIG. 7. As shown in FIG. 8, the second cushion body 30 formed of an elastic material is mounted between the opposite portion 27 and the second engaging end portion 24. When vibration generated during the vehicle traveling or vibration transferred from the engine is transferred to the first divisional body 1 or the second divisional body 2, the cushion body 3 and the second cushion body 30 absorbs the vibration. As a result, the vibration is not transferred to another divisional body. Since the cushion body 3 and the second cushion body 30 is sandwiched between the first divisional body 1 and the second divisional body 2, a relative move between the first divisional body 1 and the second divisional body 2 in the up and down direction is restricted. Thus, the engine cover of the first embodiment may greatly reduce the noise generated at the joint between the divisional bodies as described above. In the engine cover of first embodiment, the first engaging end portion 14 is pressure-contacted to the second engaging end portion 24, and the first engaging end portion 14 and the second engaging end portion 24 are attached with each other. Therefore, the rattle generated at the joint between the first divisional body 1 and the second divisional body 2 may be further reduced. As a result, the engine cover of the first embodiment may further reduce the noise generated at the joint between the divisional bodies as described above. Since the cushion body is not mounted between the first engaging end portion 14 and the main body side engaging portion 25, the first engaging end portion 14 can be easily inserted between the main body side engaging portion 25 and the second engaging end portion 24. Thus, the assembly work of the engine cover of the first embodiment can be improved.

In the engine cover of the first embodiment, when the first divisional body 1 and the second divisional body 2 are assembled to the engine side member, the rear end portion of the second cover main body 20 is arranged on the front end portion of the first cover main body 10. In the engine cover according to the first embodiment as described above, the third cushion body (not shown) is fixed to the lower surface of the rear end portion of the second cover main body 20 excepting the main body side engaging portion 25. Accordingly, the rattle is not generated in joining portion between the rear end portion of the first cover main body 10 and front end portion of the second cover main body 20.

As shown in FIG. 7, when the first divisional body 1 and the second divisional body 2 are assembled to the engine side member, the upper surface 14*a* of the first engaging end portion 14 is arranged in the down direction from the upper surface 10*a* of the first cover main body 10 and the upper surface 25*a* of the main body side engaging portion 25. The first engaging end portion 14 is pressed toward the main body side engaging portion 25 by the cushion body 3. Thus, according to the engine cover of the first embodiment, the upper surface 10*a* of the first cover main body 10 and the upper surface 25*a* of the main body side engaging portion 25 (the upper surface 20*a* of the second cover main body 20) can be surely arranged on the coplanar surface. As a result, the design in the engine cover of the first embodiment can be improved.

In the engine cover of the first embodiment, the cushion body 3 and the second cushion body 30 of the sponge shape is used. However, the material of the cushion body 3 and the second cushion body 30 in engine cover in accordance with the present invention is not limited to this. For example, sponge rubber, silicon rubber, polyurethane or the like may be used as the material of the cushion body 3 and/or the second cushion body 30. Also, non-woven fabric composed of material such as PET may be used.

In the engine cover of the first embodiment, the first fixed portion 12 and the second fixed portion 22 are formed in a mere through hole shape. However, the first fixed portion 12 and the second fixed portion 22 in the engine cover in accordance with the present invention may be formed in a dipping bowl shape or an elongated hole shape. At this time, the first fixed portion 12 and the second fixed portion 22 may be greatly moved after they are pre-fixed to the engine side member. Thus, the first divisional body 1 and the second divisional body 2 may be easily positioned with respect to the engine side member or another divisional body.

In the engine cover of the first embodiment, the first fixed portion 12 and the second fixed portion 22 are configured as plural through holes. However, the first fixed portion 12 and the second fixed portion 22 in the engine cover in accordance with the present invention may be configured as one through hole. The first fixed portion 12 and the second fixed portion 22 may be formed in other shapes. For example, the first fixed portion 12 and the second fixed portion 22 are formed in protrusion shape, and an engine side mounting portion of a hole shape is provided to the engine side member. As a result, the first divisional body 1 and the second divisional body 2 may be assembled to the engine side member by engaging the first fixed portion 12 and the second fixed portion 22 with the engine side mounting portion.

In the engine cover of the first embodiment, after the first divisional body 1 is pre-fixed to the engine side member, the second divisional body 2 is pre-fixed to the engine side member. However, a method for mounting the engine cover in accordance with the present invention to the engine side member is not limited to this. For example, after the second divisional body 2 is pre-fixed to the engine side member, the first divisional body 1 may be pre-fixed to the engine side member. At this time, since the first mounting end portion 11 of the first divisional body 1 hangs down due to the gravity when the first divisional body 1 is pre-fixed to the engine side member, the first engaging end portion 14 can be easily attached to the second engaging end portion 24.

Second Embodiment

Figure 9:
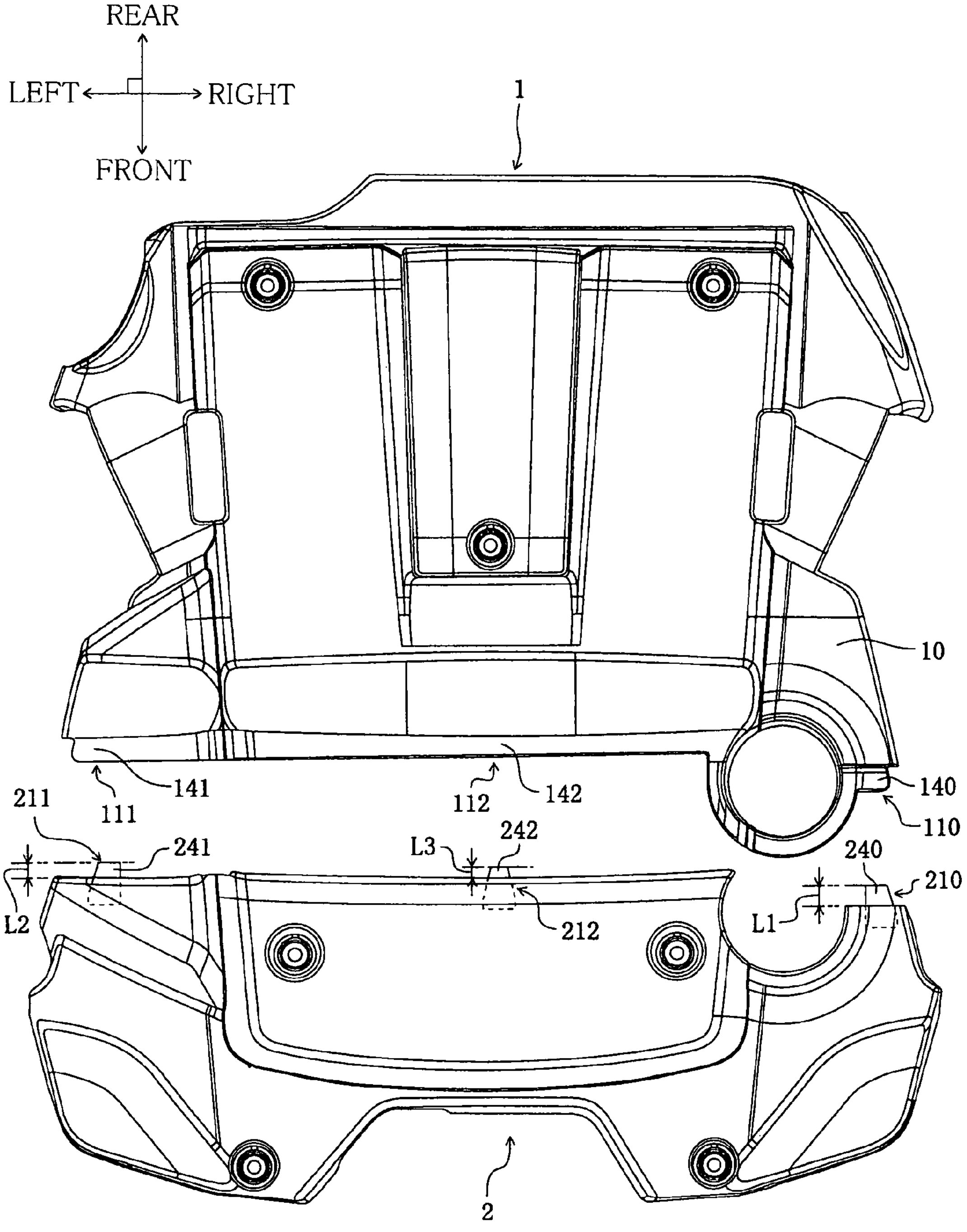
FIG. 9 is a top view schematically illustrating an engine cover in accordance with a second embodiment of the present invention.

The engine cover of the second embodiment is the same as the engine cover of the first embodiment except for including three groups of mounting structure portions. FIG. 9 is a top view schematically illustrating the engine cover in accordance with the second embodiment of the present invention. Hereinafter, a front, a rear, a left and a right in the second embodiment indicate a front, a rear, a left and a right shown in FIG. 9. In the Second Embodiment, note that the term, "up," specifies the direction toward the viewer of FIG. 9, and the term, "down," specifies the direction away from the sheet of FIG. 9.

The first divisional body 1 in the engine cover of the second embodiment includes three first mounting end portions 110, 111 and 112. The three first mounting end portions 110, 111 and 112 are provided in the front end portion of the first cover main body 10. In particular, a right side first mounting end portion 110 which is one of the first mounting end portions is provided in the same position as the first mounting end portions 11 in the engine cover of the first embodiment. A left side first mounting end portion 111 which is another of the first mounting end portions is provided in the left side of the front end portion of the first cover main body 10. A middle side first mounting end portion 112 which is the other one of the first mounting end portions is provided substantially in the middle of the left and right direction in the front end portion of the first cover main body 10. A first engaging end portion in the right side first mounting end portion 110 refers to a right side first engaging end portion 140. A first engaging end portion in the left side first mounting end portion 111 refers to a left side first engaging end portion 141. A first engaging end portion in the middle side first mounting end portion 112 refers to a middle side first engaging end portion 142. A length in the front and rear direction of the right side first engaging end portion 140, a length in the front and rear direction of the left side first engaging end portion 141 and a length in the front and rear direction of the middle side first engaging end portion 142 are all the same.

The second divisional body 2 in the engine cover of the second embodiment includes three second mounting end portions 210, 211 and 212. The three second mounting end portions 210, 211 and 212 are provided in the rear end portion of the second cover main body 20. In particular, a right side second mounting end portion 210 which is one of the second mounting end portions is provided in the same position as the second mounting end portions 21 in the engine cover of the first embodiment. A left side second mounting end portion 211 which is another of the second mounting end portions is provided in the left side of the rear end portion of the second cover main body 20. A middle side second mounting end portion 212 which is the other one of the second mounting end portions is provided in the substantially middle of the left and right direction in the rear end portion of the second cover main body 20. A second engaging end portion in the right side second mounting end portion 210 refers to a right side second engaging end portion 240. A second engaging end portion in the left side second mounting end portion 211 refers to a left side second engaging end portion 241. A second engaging end portion in the middle side second mounting end portion 212 refers to a middle side second engaging end portion 242. A length L1 of the right side second engaging end portion 240 protruded from the second cover main body, a length L2 of the left side second engaging end portion 241 protruded from the second cover main body and a length L3 of the middle side second engaging end portion 242 protruded from the second cover main body have the following relation: L1>L2>L3.

Since the engine cover of the second embodiment includes the three groups of mounting structure portions, the first divisional body 1 and the second divisional body 2 are firmly fixed with each other. Thus, the engine cover of the second embodiment can surely prevent the noise from generating at the joint between the divisional bodies during the vehicle traveling.

In the engine cover of the second embodiment, the length L1 of the right side second engaging end portion 240 protruded from the second cover main body, the length L2 of the left side second engaging end portion 241 protruded from the second cover main body and the length L3 of the middle side second engaging end portion 242 protruded from the second cover main body have the following relation: L1>L2>L3. Therefore, when the second divisional body 2 is assembled to the engine side member, firstly the right side second engaging end portion 240 is inserted downward of the right side first engaging end portion 140, secondly the left side second engaging end portion 241 is inserted downward of the left side first engaging end portion 141, and thirdly the middle side second engaging end portion 242 is inserted downward of the middle side first engaging end portion 142. Each second engaging end portion 240-242 raises each first engaging end portion 140-142, so that the second fixed portion 22 of the second divisional body 2 is fixed to the engine side member. Thus, the engine cover of the second embodiment can surely hold the three first engaging end portion 140-142 between each corresponding second engaging end portion 240-242 and the main body side engaging portion. Accordingly, the engine cover of the second embodiment can greatly improve the work for assembling the first divisional body 1 and the second divisional body 2 to the engine side member in spite of including the three groups of mounting structure portions.

When the engine cover of the present invention is provided with plural groups of mounting structure portions, the work for assembling the first divisional body 1 and the second divisional body 2 to the engine side member may be improved when the length of one second engaging end portion is different from the length of another second engaging end portion, as the same as the engine cover of the second embodiment. When the engine cover of the present invention is provided with plural groups of mounting structure portions, the length of each second engaging end portions may be the same. At this time, the mounting work may be deteriorated, compared with the engine cover of the second embodiment. However, since the first divisional body 1 and the second divisional body 2 are firmly fixed as the same as the engine cover of the second embodiment, it is possible to prevent the noise during the vehicle traveling or the noise due to the vibration transferred from the engine from generating as described above.

Third Embodiment

Figure 10:
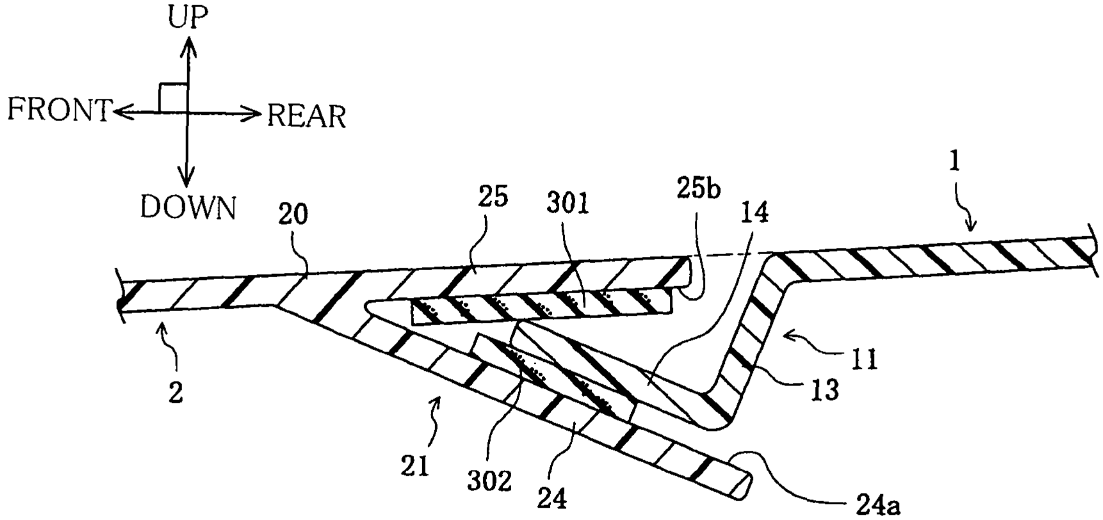
FIG. 10 is an enlarged sectional view of a main part schematically illustrating an appearance of a first divisional body and a second divisional body in an engine cover assembled to an engine side member in accordance with a third embodiment of the present invention.

The engine cover according to the third embodiment includes the above-described (1), (4) and (6). The engine cover of the third embodiment is the same as the engine cover of the first embodiment except for a shape of the first mounting end portion, a shape of the second mounting end portion and a position of the cushion body. FIG. 10 is an enlarged sectional view of a main part schematically illustrating an appearance of the first divisional body and the second divisional body in the engine cover assembled to the engine side member in accordance with the third embodiment of the present invention. Hereinafter, a front, a rear, an up and a down in the third embodiment indicate a front, a rear, an up and a down shown in FIG. 10.

The second mounting end portion 21 in the engine cover of the third embodiment includes the second engaging end portion 24, but doesn't include the second leg portion. The second engaging end portion 24 is continued to the second cover main body 20 and extends in the diametric direction outwardly (the rear direction) and down direction of the second cover main body 20. The thickness of the second engaging end portion 24 is nearly constant, and the thickness of the main body side engaging portion 25 is nearly constant. Thus, the distance between the second engaging end portion 24 and the main body side engaging portion 25 increases toward the outer circumferential side of the second cover main body 20 from the inner circumferential side thereof.

The first mounting end portion 11 in the engine cover of the third embodiment includes the first leg portion 13 and the first engaging end portion 14. The thickness of the first engaging end portion 14 is nearly constant. The first engaging end portion 14 extends in the direction across the first cover main body 10. In particular, the first engaging end portion 14 extends in the diametric direction outwardly (the front direction) and up direction of the first cover main body 10. The first engaging end portion 14 extends in parallel with the second engaging end portion 24 in a state where the first divisional body 1 and the second divisional body 2 is integrated (i.e., a state shown in FIG. 10). The first cover main body 10 and the main body side engaging portion 25 are arranged substantially on the coplanar surface.

Cushion bodies 301 and 302 are attached to the lower surface 25*b* of the main body side engaging portion 25 and the upper surface 24*a* of the second engaging end portion 24, respectively.

In engine cover of the third embodiment, since the second engaging end portion 24 extends in the diametric direction outwardly and down direction of the second cover main body 20, the distance between the main body side engaging portion 25 and the second engaging end portion 24 in the outer circumferential side of the second cover main body 20 can increase. Thus, the work for inserting the first engaging end portion 14 between the main body side engaging portion 25 and the second engaging end portion 24 is further facilitated, compared with the engine cover of the first embodiment. As a result, the assembly work in the engine cover of the third embodiment can be improved.

The first engaging end portion 14 extends in parallel with the second engaging end portion 24 in a state where the first divisional body 1 and the second divisional body 2 is integrated. Therefore, the first engaging end portion 14 can be stably held by the second engaging end portion 24. The cushion body 301 is sandwiched between the upper surface 14*a* of the first engaging end portion 14 and the lower surface 25*b* of the main body side engaging portion 25, and the cushion body 302 is sandwiched between the upper surface 24*a* of the second engaging end portion 24 and the lower surface 14*b* of the first engaging end portion 14. As a result, the first engaging end portion 14 is stably held between the main body side engaging portion 25 and the second engaging end portion 24.

in the engine cover of the third embodiment, the first engaging end portion 14 extends in parallel with the second engaging end portion 24. However, the parallel between the first engaging end portion 14 and the second engaging end portion 24 means including substantially parallel.

Forth Embodiment

Figure 11:
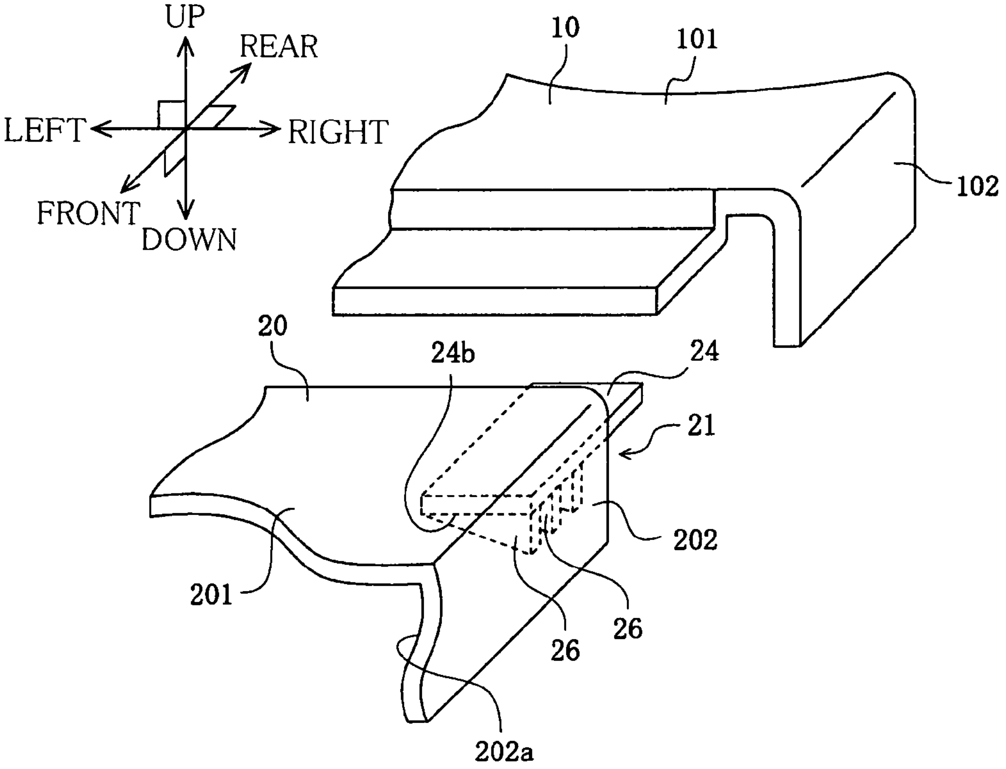
FIG. 11 is an enlarged perspective view of a main part schematically illustrating an engine cover in accordance with a forth embodiment of the present invention.

The engine cover according to the forth embodiment includes the above-described (1), (3), (5) and (6). The engine cover of the forth embodiment is the same as the engine cover of the first embodiment except for a shape of the first cover main body, a shape of the second cover main body and a shape of the second mounting end portion. FIG. 11 is an enlarged perspective view of a main part schematically illustrating the engine cover in accordance with the forth embodiment of the present invention. Hereinafter, an up, a down, a left, a right, a front and a rear in the forth embodiment indicate an up, a down, a left, a right, a front and a rear shown in FIG. 11.

The first cover main body 10 in the engine cover of the forth embodiment includes a first upper wall portion 101 and a first side wall portion 102 and has a curved plate shape. In particular, the first upper wall portion 101 is formed of substantially a flat plate shape and includes a first fixed portion (not shown). The first side wall portion 102 is continued to a right end portion of the first upper wall portion 101 and extends downward. The second cover main body 20 includes a second upper wall portion 201 and a second side wall portion 202 and has a curved plate shape. In particular, the second upper wall portion 201 is formed of substantially a flat plate shape and includes a second fixed portion (not shown). The second side wall portion 202 is continued to a right end portion of the second upper wall portion 201 and extends downward.

In the engine cover of the forth embodiment, the second engaging end portion 24 is continued to the second side wall portion 202. In particular, the right end portion of the second engaging end portion 24 is continued to an inner surface 202*a* of the second side wall portion 202 and is protruded in the left direction shown in FIG. 11. One portion of the second engaging end portion 24 is arranged in the outer circumferential side (the rear side) of the second cover main body 20 from the outer circumferential end portion of the rear side of the second cover main body 20. The second engaging end portion 24 also extends in the diametric direction (in the front and rear direction shown in FIG. 11) of the second cover main body 20 outwardly.

A rib 26 is installed between the lower surface 24*b* of the second engaging end portion 24 and the inner surface 202*a* of the second side wall portion 202. The second engaging end portion 24 is reinforced by the rib 26.

In the engine cover of the forth embodiment, since the second engaging end portion 24 is continued to the second side wall portion 202, the second leg portion such as the engine cover of the first embodiment is not required. As a result, the second mounting end portion 21 can be formed in a simple shape.

Fifth Embodiment

Figure 12:
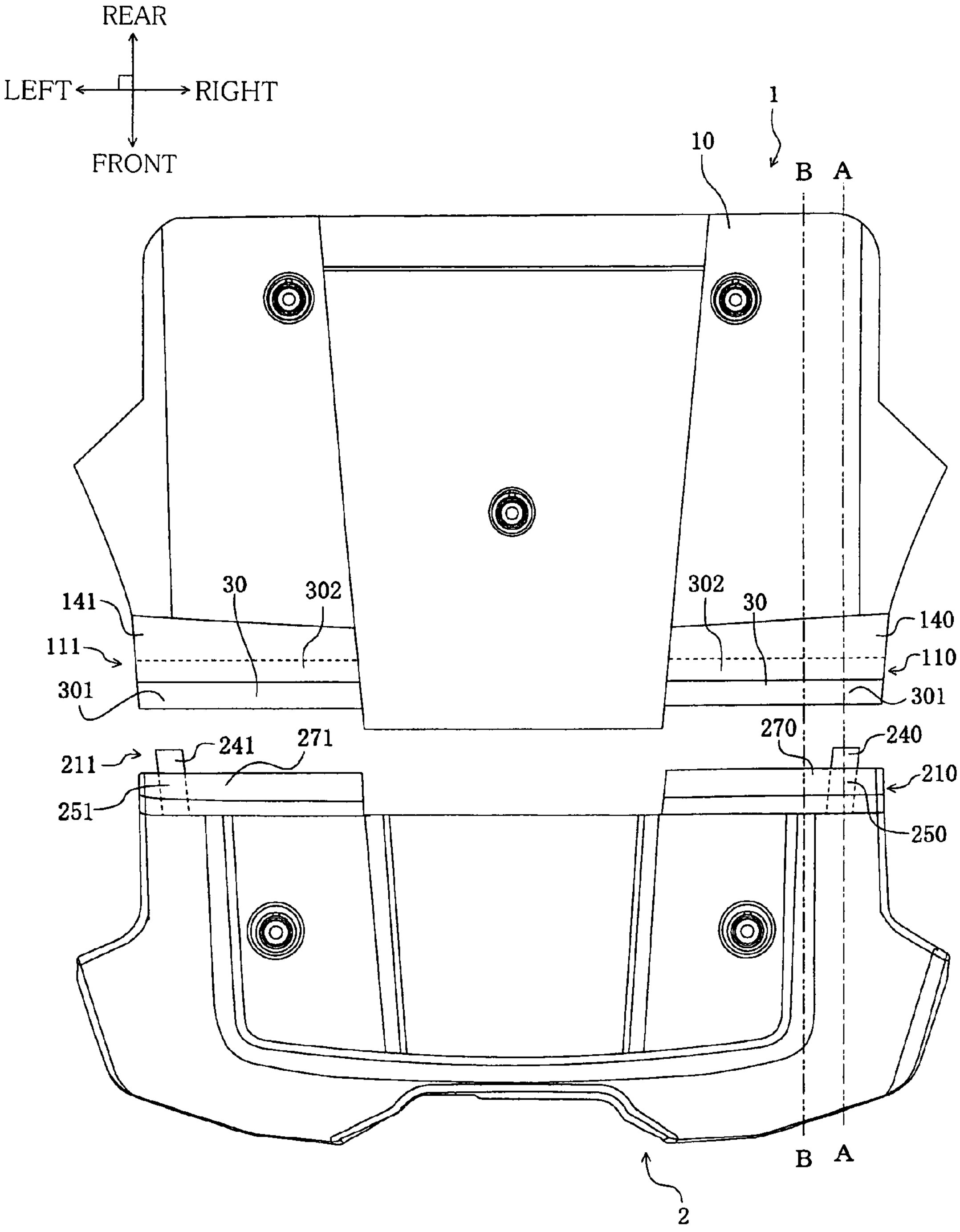
FIG. 12 is a top view schematically illustrating an engine cover in accordance with a fifth embodiment of the present invention.
Figure 13:
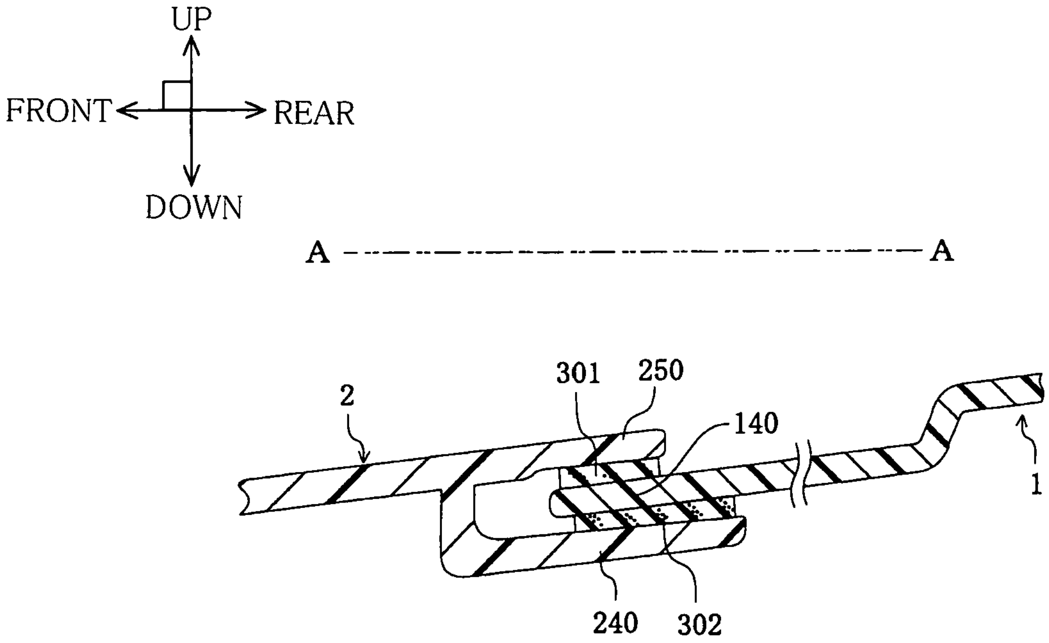
FIG. 13 is an enlarged sectional view of a main part schematically illustrating an appearance of a first divisional body and a second divisional body in an engine cover assembled to an engine side member in accordance with a fifth embodiment of the present invention.
Figure 14:
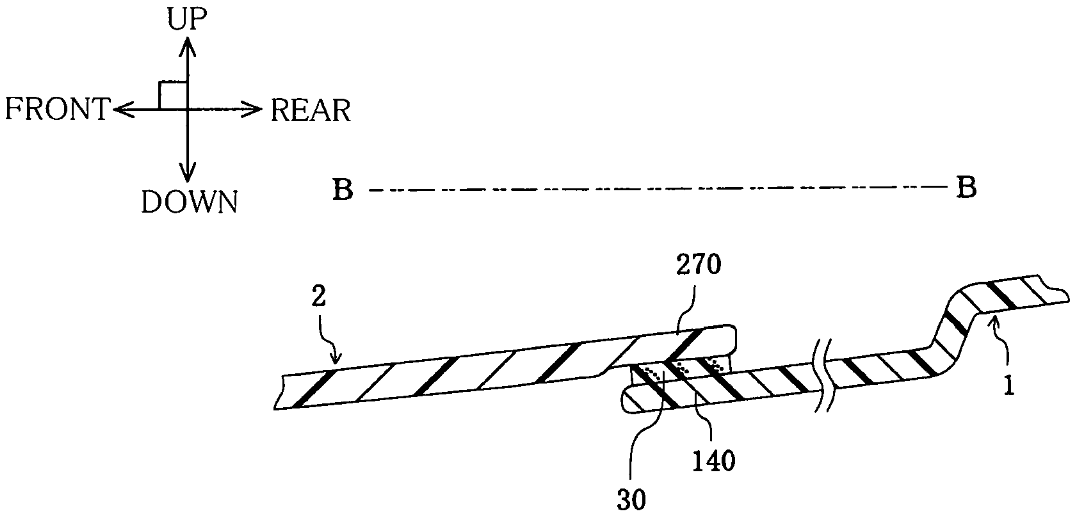
FIG. 14 is an enlarged sectional view of a main part schematically illustrating an appearance of a first divisional body and a second divisional body in an engine cover assembled to an engine side member in accordance with a fifth embodiment of the present invention.

The engine cover according to the fifth embodiment includes the above-described (1) and (6). The engine cover of the fifth embodiment is the same as the engine cover of the first embodiment except for a shape of the first cover main body and a shape of the second cover main body. FIG. 12 is a top view schematically illustrating the engine cover in accordance with the fifth embodiment of the present invention. FIG. 13 and FIG. 14 are enlarged sectional views of a main part schematically illustrating an appearance of the first divisional body and the second divisional body in the engine cover assembled to the engine side member in accordance with the fifth embodiment of the present invention. FIG. 13 refers to an appearance of cutting the first divisional body and the second divisional body in A-A position of FIG. 12. FIG. 14 refers to an appearance of cutting the first divisional body and the second divisional body in B-B position of FIG. 12. Hereinafter, a left and a right in the fifth embodiment indicate a left and a right shown in FIG. 12. An up and a down in the fifth embodiment indicate an up and a down shown in FIG. 13. A front and a rear in the fifth embodiment indicate a front and a rear shown in FIG. 12 and FIG. 13.

The first divisional body 1 in the engine cover of the fifth embodiment includes two first mounting end portions 110 and 111. As shown in FIG. 12 to FIG. 14, a right side first mounting end portion 110 which is one of the first mounting portions is formed at the right side portion of the front end portion of the first divisional body 1. A left side first mounting end portion 111 which is another of the first mounting portions is formed at the left side portion of the front end portion of the first divisional body 1. In the engine cover of the fifth embodiment, a substantially middle portion of the left and right direction in the front end portion of the first divisional body 1 and the rear side portion of the first divisional body 1 correspond to the first cover main body 10. The right side first mounting end portion 110 and the left side first mounting end portion 111 are formed in a concave shape. That is, the right side portion of the front end portion of the first divisional body 1 and the left side portion of the front end portion thereof is arranged in down direction of the first cover main body 10. In the engine cover of the fifth embodiment, the entire right side first mounting end portion 110 corresponds to the right side first engaging end portion 140, and the entire left side first mounting end portion 111 corresponds to the left side first engaging end portion 141. In the engine cover of the fifth embodiment, the substantially middle portion of the left and right direction in the front end portion of the first cover main body 10 expands in the diametric direction (i.e., the front direction of FIG. 12) of the first cover main body 10 outwardly, compared with the right side first mounting end portion 110 and the left side first mounting end portion 111.

As shown in FIG. 12, a cushion body 301 and a second cushion body 30 are attached on each upper surface of a right side first engaging end portion 140 and a left side first engaging end portion 141. The cushion body 301 and the second cushion body 30 are integrated with each other. As shown in FIG. 12 and FIG. 13, a cushion body 302 is attached on each lower surface of the right side first engaging end portion 140 and the left side first engaging end portion 141.

The second divisional body 2 includes two second mounting end portions 210 and 211. As shown in FIG. 12 to FIG. 14, a right side second mounting end portion 210 which is one of the second mounting portions is formed at the right side portion of the rear end portion of the second divisional body 2. A left side second mounting end portion 211 which is another of the second mounting portions is formed at the left side portion of the rear end portion of the second divisional body 2. In the engine cover of the fifth embodiment, the substantially middle portion of the left and right direction in the rear end portion of the second divisional body 2 is retracted in the inner circumferential direction (i.e., the front direction of FIG. 12) of the second cover main body 20, compared with the right side portion of the rear end portion of the second divisional body 2 and the left side portion of the rear end portion of the second divisional body 2. The second engaging end portion in the right side mounting end portion 210 refers to a right side second engaging end portion 240. The second engaging end portion in the left side mounting end portion 211 refers to a left side second engaging end portion 241. The engine cover of the fifth embodiment includes two main body side engaging portions 250 and 251. A right side main body side engaging portion 250 which is one of the main body side engaging portions is a portion facing the right side second engaging end portion 240 in the second cover main body 20. A left side main body side engaging portion 251 which is another of the main body side engaging portions is a portion facing the left side second engaging end portion 241 in the second cover main body 20. The engine cover of the fifth embodiment includes two opposite portions 270 and 271. A right side opposite portion 270 which is one of the opposite portions is a portion adjoining the right side or the left side of the right side main body side engaging portion 240 in the second cover main body 20. A left side opposite portion 271 which is another of the opposite portions is a portion adjoining the right side or the left side of the left side main body side engaging portion 241 in the second cover main body 20.

In the engine cover of the fifth embodiment, the right side first engaging end portion 140 of the first divisional body 1 is held between the right side main body side engaging portion 250 of the second divisional body 2 and the right side second engaging end portion 240 thereof. The left side first engaging end portion 141 is held between the left side main body side engaging portion 251 of the second divisional body 2 and the left side second engaging end portion 241 thereof. As a result, the first divisional body 1 and the second divisional body 2 are integrated with each other. At this time, the first cover main body 10 and the second cover main body 20 are joined together by butting the first cover main body 10's substantially middle portion in the left and right direction of the first cover main body 10 in the front end portion thereof to the second cover main body 20's substantially middle portion in the left and right direction of the second cover main body 20 in the rear end portion thereof. Thus, the work for assembling the first divisional body 1 and the second divisional body 2 to the engine side member may be also implemented only by the following processes: a process for pre-fixing the first divisional body 1 to the engine side member, a process for fixing the second divisional body 2 to the engine side member while the right side second engaging end portion 240 raises the right side first engaging end portion 140 and the left side second engaging end portion 241 raises the left side first engaging end portion 141, and a process for fixing the first divisional body 1 to the engine side member. Accordingly, the work for assembling the engine cover of the fifth embodiment can be improved.

As shown in FIG. 13, the cushion bodies 301 and 302 formed of the elastic material are mounted between the right side first engaging end portion 140 and the right side second engaging end portion 240 and between the right side first engaging end portion 140 and the right side main body side engaging portion 250, respectively. As shown in FIG. 14, the second cushion body 30 formed of the elastic material is also mounted between the right side first engaging end portion 140 and the right side opposite portion 270. Although not shown, the cushion bodies 301 and 302 are also mounted between the left side first engaging end portion 141 and the left side second engaging end portion 241 and between the left side first engaging end portion 141 and the left side main body side engaging portion 251, respectively. Also, the second cushion body 30 is mounted between the left side first engaging end portion 141 and the left side opposite portion 271. As a result, the engine cover of the fifth embodiment can greatly reduce the noise generated at the joint between divisional bodies.

While the invention has been shown and described with respect to the preferred embodiments, it will be understood by those skilled in the art that various changes and modification may be made without departing from the spirit and scope of the invention as defined in the following claims.

What is claimed is:

1. An engine cover having plural divisional bodies for covering an upper surface of an engine side member in a vehicle, comprising:

a first divisional body, which is one of the divisional bodies, including a first cover main body and a first mounting end portion, wherein the first cover main body is formed of a plate shape and has a first fixed portion fixed to the engine side member, and wherein the first mounting end portion is provided to one end portion of the first cover main body and includes a first engaging end portion arranged in a down direction of the first cover main body and extending in a diametric direction of the first cover main body outwardly;

a second divisional body, which is another of the divisional bodies, including a second cover main body and a second mounting end portion, wherein the second cover main body is formed of a plate shape and has a second fixed portion fixed to the engine side member, and wherein the second mounting end portion is provided to one end portion of the second cover main body and includes a second engaging end portion arranged in a down direction of the second cover main body and extending in a diametric direction of the second cover main body outwardly; and a cushion body formed of an elastic material, wherein at least one portion of the second engaging end portion is arranged in an inner circumferential side of the second cover main body from an outer circumferential end portion of the second cover main body;

wherein the first engaging end portion is held between the second engaging end portion and a main body side engaging portion which is a portion facing the second engaging end portion in the second cover main body to integrate the first divisional body and the second divisional body; and wherein the cushion body is mounted between the first engaging end portion and the main body side engaging portion or between the first engaging end portion and the second engaging end portion.

2. The engine cover according to claim 1, wherein a distal end of the second engaging end portion extends beyond the outer circumferential end portion of the second cover main body toward an outer peripheral side of the engine cover.

3. The engine cover according to claim 1, wherein the first mounting end portion includes a first leg portion extending downward from the outer circumferential end portion of the first cover main body and continued to the first engaging end portion; and wherein the second mounting end portion includes a second leg portion extending downward from a lower surface, the lower surface being disposed on a more diametrically inward side than the outer circumferential end portion of the second cover main body is disposed, and the second leg portion being continued to the second engaging end portion.

4. The engine cover according to claim 1, wherein the second cover main body, which is formed of a curved plate shape, includes an upper wall portion having a plate shape and a side wall portion continued to the upper wall portion and extending downward; and wherein the second engaging end portion is continued to the side wall portion.

5. The engine cover according to claim 1, wherein a distance between the second engaging end portion and the main body side engaging portion increases toward the outer circumferential side of the second cover main body from the inner circumferential side of the second cover main body; and wherein the first engaging end portion extends in parallel with the second engaging end portion in a state where the first divisional body and the second divisional body is integrated.

6. The engine cover according to claim 1, further comprising: a second cushion body formed of an elastic material, wherein one portion of the first engaging end portion faces an opposite portion which is one portion of the second cover main body excepting the main body side engaging portion;

wherein the cushion body is mounted only between the first engaging end portion and the second engaging end portion; and wherein the second cushion body is mounted between the first engaging end portion and the opposite portion.

7. The engine cover according to claim 1, wherein a center of the first fixed portion is different from a center of gravity in the first divisional body; and wherein the first mounting end portion is arranged in an area opposed to the center of the first fixed portion with the center of gravity in the first divisional body being interposed in between.

* * * * *